(12) United States Patent
Jones (10) Patent No.: US 8,313,150 B2
(45) Date of Patent: Nov. 20, 2012

(54) HOIST

(76) Inventor: Eldon D. Jones, Lake Crystal, MN (US)

( * ) Notice: Subject to any disclaimer, the term of this patent is extended or adjusted under 35 U.S.C. 154(b) by 538 days.

(21) Appl. No.: 12/210,659

(22) Filed: Sep. 15, 2008

(65) Prior Publication Data

US 2009/0058171 A1   Mar. 5, 2009

Related U.S. Application Data (63) Continuation-in-part of application No. 11/812,677, filed on Jun. 20, 2007, now Pat. No. 7,523,994.

(51) Int. Cl.
*B60P 1/04* (2006.01)

(52) U.S. Cl. .................................... 298/22 J; 298/19 B (58) Field of Classification Search ................ 298/22 R, 298/22 J, 22 P, 22 D, 19 B, 17 S; 254/3 C, 254/93 VA See application file for complete search history.

(56) References Cited

U.S. PATENT DOCUMENTS

| | | | |
|---|---|---|---|
| 1,409,916 A | 3/1922 | Barkman et al. |
| 1,534,439 A | 4/1925 | Burkhardt et al. |
| 1,993,203 A | 3/1935 | Barrett |
| 2,144,599 A | 3/1938 | Anthony |
| 2,223,275 A | 11/1940 | Valenzuela |
| 2,233,111 A | 2/1941 | Roberts |
| 2,358,224 A | 4/1942 | Golay |
| 2,488,790 A | 3/1947 | Wood |
| 2,603,518 A | 2/1948 | Golay |
| 2,509,911 A | 12/1948 | Dore |
| 2,611,642 A | 10/1949 | Gwinn |
| 2,836,460 A | 5/1958 | Lundell |
| 2,856,232 A | 10/1958 | Mentes |
| 2,953,408 A | 9/1960 | Koenig |
| 3,010,727 A | 11/1961 | Swensen et al. |
| 3,049,378 A | 8/1962 | Nelson |
| 3,078,075 A | 2/1963 | Richter |
| 3,211,428 A | 10/1965 | Sprackliin |
| 3,348,861 A | 10/1967 | Curtis et al. |
| RE26,455 E | 9/1968 | Jones |
| 3,485,400 A | 12/1969 | Pewthers |
| 3,594,042 A | 7/1971 | Gauch |
| 3,620,458 A | 11/1971 | Kitchener |
| 3,791,695 A | 2/1974 | Seniuk |
| 3,813,124 A | 5/1974 | Roland |
| 3,897,882 A | 8/1975 | Budoff |
| 3,964,626 A | 6/1976 | Arregui |
| 4,010,826 A | 3/1977 | Jones |
| 4,029,358 A | 6/1977 | Bergdolt |

(Continued)

FOREIGN PATENT DOCUMENTS

CA           722518         11/1965

(Continued)

OTHER PUBLICATIONS

Dump Body and Conversion Hoist Charts, Fourth Edition, National Truck Equipment Association, Date Unknown.

(Continued)

*Primary Examiner* — Stephen Gordon (74) *Attorney, Agent, or Firm* — Matthew A. Pequignot; Pequignot + Myers LLC (57) ABSTRACT

A hoist capable of raising and lowering a truck bed to and from a truck frame. In certain example embodiments, a scissor-type hoist having a hydraulic cylinder base pivot located to improve hoist lift efficiency.

7 Claims, 10 Drawing Sheets

U.S. PATENT DOCUMENTS

| | | |
|---|---|---|
| 4,052,105 A | 10/1977 | Moe |
| 4,109,810 A | 8/1978 | Jones |
| 4,176,881 A | 12/1979 | Cole |
| 4,261,520 A | 4/1981 | Hetrick |
| 4,302,050 A | 11/1981 | Jones |
| 4,741,576 A | 5/1988 | Jones |
| 4,762,370 A | 8/1988 | Corompt et al. |
| 4,938,454 A | 7/1990 | Jones |
| 5,040,849 A | 8/1991 | Thomas et al. |
| 5,048,896 A | 9/1991 | Channell |
| 5,195,385 A | 3/1993 | Johnson |
| 6,186,596 B1 | 2/2001 | Jones |
| 6,257,670 B1 * | 7/2001 | Rogers .......................... 298/18 |
| 6,543,856 B2 | 4/2003 | Jones |
| 6,561,589 B2 | 5/2003 | Jones |
| 7,523,994 B2 * | 4/2009 | Jones .......................... 298/22 J |

FOREIGN PATENT DOCUMENTS

| | | |
|---|---|---|
| FR | 1414976 | 9/1965 |
| GB | 2049566 | 12/1980 |

OTHER PUBLICATIONS

Lo Boy Truck Hoist, Crysteel Manufacturing Sales Brochure, Date Unknown.

* cited by examiner

HOIST

RELATED APPLICATION DATA

This application is a continuation-in-part and claims the benefit of priority of U.S. patent application Ser. No. 11/812,677, filed on Jun. 20, 2007, now U.S. Pat. No. 7,523,994, and entitled HOIST, and hereby incorporates such application, in its entirety, by reference.

FIELD OF THE INVENTION

This invention relates to improved hoists useful, for example, for lifting and lowering truck dump bodies. In certain example embodiments, this invention relates to improved scissor-type hoists, which exhibit improved efficiency and/or performance.

BACKGROUND OF THE INVENTION

Extendible and retractable hoists for raising and lowering the dump bed of a truck about a pivoting hinge are well known in the art and come in many different types and designs (whether they be rear or side dump vehicles). The term "truck" is used herein to describe all types of vehicles which employ such hoists, including light, medium and heavy duty dump trucks and trailers.

In a typical hydraulic truck hoist, one or more hydraulic cylinders in a hoist frame lie lengthwise in relation to the frame rails of the vehicle and underneath the truck bed. As the hoist's cylinder extends, one end of the hoist frame pushes against the underside of the dump bed to which one end of the hoist is pivotally attached while the other end of the hoist frame pushes against the frame of the truck to which the other end of the hoist is pivotally attached. This causes the bed to rotate about its rear hinge pivot whereby the dump bed is raised. Retraction of the cylinder causes the bed to be lowered.

Generally speaking, truck hoist designs known prior to the subject invention have one or more inefficiencies and/or drawbacks (or problems) associated with their use. For example, some hoist designs are configured to require long, telescopic hydraulic cylinder strokes to achieve sufficient dump angles. However, as a telescopic hydraulic cylinder extends e.g., in a long "stroke" towards its full displacement, the amount of force that it is capable of providing decreases significantly. The required length of the cylinder also impacts the cycle time required to operate the hoist. Although scissor-type hoists reduce this inefficiency (at least in part), scissor-type hoists exhibit other inefficiencies and/or problems.

For example, known scissor hoists are configured such that the hoist cylinder is nearly parallel to the dump bed when the dump bed is in the non-raised or lowered position and thus has very little initial leverage at the beginning of the lifting process. Specifically, in such designs, during the initial lift phase, much of the force of the cylinder is inefficiently directed because of the low angle of cylinder thrust relative to the truck frame and dump bed (which directs cylinder forces along the length of the truck and dump bed frame rather than in the more efficient raising direction which changes as the dump body is raised). Therefore, much of the hydraulic cylinder's lift force is unused at the beginning of lift operation. As a result, such prior art hoists often require larger and more expensive (or multiple) cylinders otherwise unnecessary in later lifting phases (i.e., they are only required to accommodate the initial, inefficient lifting phase).

In view of the above, it is apparent that there exists a need in the art for a hoist which addresses, overcomes, mitigates, and/or solves one or more of the above problems and/or drawbacks and/or inefficiencies in the art. It is a purpose of this invention to fulfill this and/or other needs in the art which will become more apparent to the skilled artisan once given the following disclosure.

SUMMARY OF THE INVENTION

Generally speaking, this invention addresses the above-described needs in the art by providing a hoist which, by way of its unique structure and/or configuration, exhibits improved lift efficiency and/or performance.

In certain example (non-limiting) embodiments, therein is provided:

a hoist, in combination with a truck frame and a dump bed frame, comprising:

a truck frame including a pair of spaced apart frame rails;

a hoist pedestal mounted to the truck frame and extending upwardly above a top surface of the frame rails;

a first lever arm having a first end connected to the pedestal via a first pivot and having a second end connected to a first end of a second lever arm via a second pivot, the second lever arm having a second end pivotally connected to a dump bed frame via a third pivot;

an extendible and retractable cylinder connected at a first end via a fourth pivot and connected at a second end to the second lever arm via a fifth pivot, the fifth pivot located on the second lever arm between the second pivot and the third pivot;

wherein in an initial, non-lift position, the first lever arm and the second lever arm are in a generally folded orientation and the fourth pivot is located generally below the first pivot a selected offset distance downward from the first pivot thereby to angle the cylinder relative to a lift direction of the dump bed frame.

In an alternative embodiment, therein is provided:

a hoist for installation on a truck frame and a dump bed frame for raising or lowering a dump bed to and from a truck frame, the hoist comprising:

a pedestal for mounting the hoist to a truck frame;

a first lever arm having a first end connected to the pedestal via a first pivot and having a second end connected to a first end of a second lever arm via a second pivot, the second lever arm having a second, distal end for pivotally connecting to a dump bed frame via a third pivot;

an extendible and retractable cylinder connected at a first end via a fourth pivot and connected at a second end to the second lever arm via a fifth pivot, the fifth pivot located on the second lever arm between the second pivot and the third pivot;

wherein in an initial, non-lift position, the first lever arm and the second lever arm are in a generally folded orientation and the fourth pivot is located generally below the first pivot a selected offset distance downward from the first pivot thereby to obtain an angle of the cylinder relative to a lift direction of the dump bed frame.

In yet a further embodiment, there is provided:

a hoist for installation on a truck frame and a dump bed frame for raising or lowering a dump bed to and from a truck frame, the hoist comprising:

a first lever arm having a first end connected proximal a truck frame via a first pivot and having a second end connected to a first end of a second lever arm via a second pivot, the second lever arm having a second, distal end pivotally connected proximal a dump bed frame via a third pivot;

an extendible and retractable cylinder connected at a first end via a fourth pivot and connected at a second end to the second lever arm via a fifth pivot, the fifth pivot located on the second lever arm between the second pivot and the third pivot;

wherein in an initial, non-lift position, the first lever arm and the second lever arm are in a generally folded orientation and the fourth pivot is located generally below the first pivot a selected offset distance downward from the first pivot thereby to obtain an angle of the cylinder relative to a lift direction of the dump bed frame.

In certain embodiments, a hoist configuration is utilized which orients the hoist's lifting cylinder at a more efficient lift angle relative to a dump bed being lifted thereby improving the efficiency and/or performance (e.g., the lifting power) of the hoist. In certain non-limiting embodiments, performance and/or efficiency is improved by 10% or more, and in certain further preferred embodiments, 20% or more improvement is achieved. In still additional non-limiting but preferred embodiments, the stroke length required of the lift cylinder is reduced by 20% or more without reducing the lift capacity of the hoist.

In certain of the preferred embodiments described herein, a hoist is provided which is so structurally configured such that when the hoist is operated in a lifting phase, the cylinder will extend and exert a lifting force on the second lever arm via the fifth pivot which will cause the second lever arm to exert a lifting force on the dump bed frame via the third pivot; and the first lever arm and the second lever arm will pivot out of the generally folded orientation.

In some embodiments of the hoists described herein, the (optional) pedestal is mounted on a top, horizontal surface of one of the frame rails of a truck or vehicle. In other embodiments, a base portion of the pedestal is mounted on a side, vertical surface of one of the frame rails but the first pivot is located above the top surface of the frame rails.

In more preferred (but still non-limiting) embodiments, a space envelope extends between the spaced apart frame rails of the truck frame and the hoist is so configured and so mounted between the truck frame and the dump bed frame such that the hoist does not occupy any substantial portion of such space envelope. In the most preferred (but still non-limiting) embodiments, the hoist is so configured and so mounted between the truck frame and the dump bed frame such that the hoist does not occupy any portion of the space envelope.

In yet further embodiments of the hoists described herein, when the hoist is in the initial, non-lift position, the fourth pivot is located generally or directly in-line with a vertical centerline of the first pivot. In other embodiments, however, the fourth pivot is initially located offset from a vertical centerline of the first pivot when the hoist is in the initial, non-lift position.

In certain exemplar embodiments, when the hoist is in a generally folded orientation in the initial, non-lift position, the first and the second lever arms are at or near a generally parallel orientation with respect to one another.

In at least one variation of a hoist described herein, the hoist is so structurally configured such that when the hoist is operated in a lifting phase, and the second lever arm is caused to unfold from and lift upwardly from the first lever arm during the lifting phase, the fourth pivot moves about the first pivot and generally follows a lift direction of the second lever arm. In another embodiment, however, the first end of the extendible and retractable cylinder and the fourth pivot are each connected to the hoist pedestal or to a portion of a truck frame generally vertically below the first pivot in such a manner such that the fourth pivot does not move and/or follow the lift of the second lever arm as in other embodiments.

In yet further example embodiments, the hoist, including the (optional, and therefore only provided in certain embodiments) hoist pedestal, the first and second lever arms, and the first, second, third, fourth, and fifth pivots are each substantially duplicated on each side of a vehicle comprised in part of a truck frame and a dump bed frame. In such embodiments, the respective pairs of first, second, and third pivots (each pivot of each pair located opposite its corresponding pivot on an opposite side of the vehicle) are connected to and joined by respective first, second, and third cross-shafts. In at least one example of such an embodiment, a cross member is optionally provided to structurally connect oppositely located pedestals to one another.

In the embodiments described herein, the phrases "in or near generally parallel" or "generally parallel" do not refer to a narrow condition where the first and second lever arm structures or their associated pivots are precisely parallel to one another but, instead, refer more generally to a condition when the lever arms are folded upon one another in conventional scissor hoist fashion. Thus, significant angular deviations from a precisely parallel orientation are certainly contemplated within the meaning of these phrases or terms.

Certain specific examples of the invention are now described below with respect to certain non-limiting embodiments thereof as illustrated in the following drawings wherein:

DETAILED DESCRIPTION OF CERTAIN EMBODIMENTS

For a more complete understanding of the present invention and advantages thereof, reference is now made to the following description of various illustrative and non-limiting embodiments thereof, taken in conjunction with the accompanying drawings in which like reference numbers indicate like features.

Figure 1A:
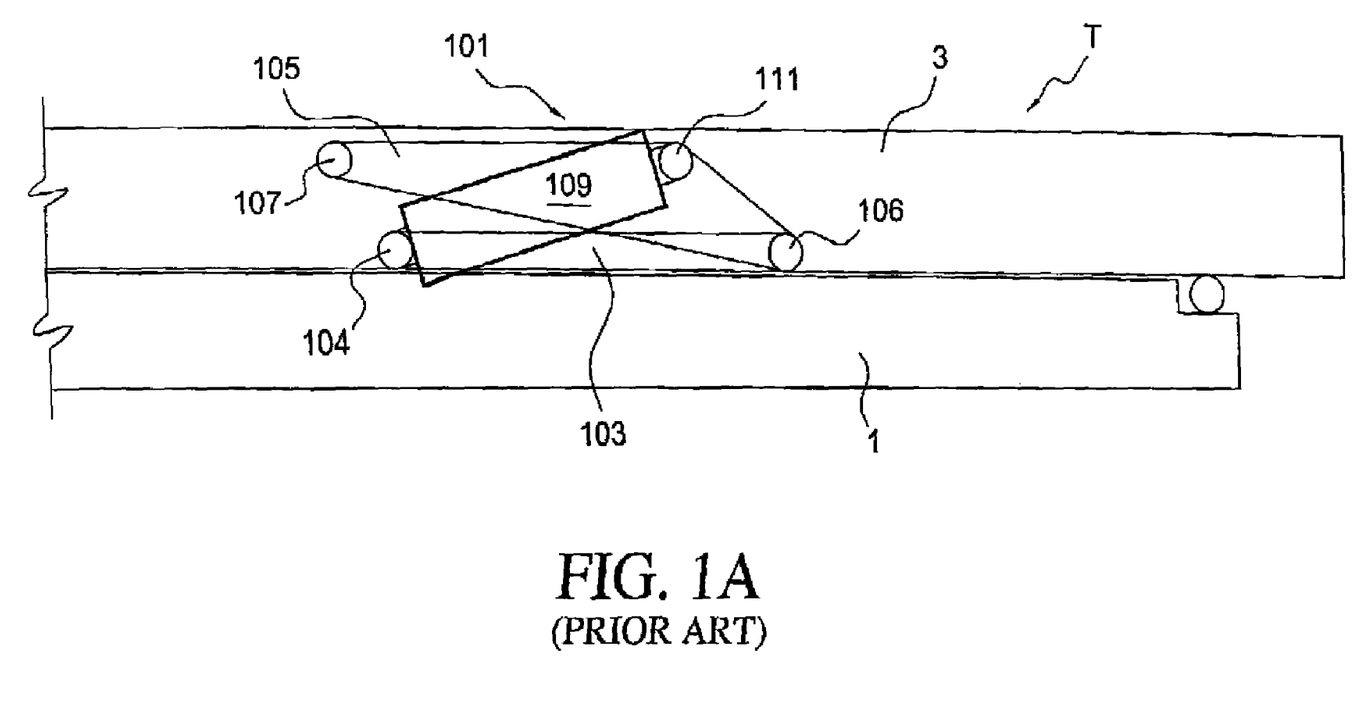
FIG. 1A is a profile, perspective view of a prior art scissor-type hoist installed between a truck frame and a dump bed illustrated in a non-extended (or non-lifted) state.
Figure 1B:
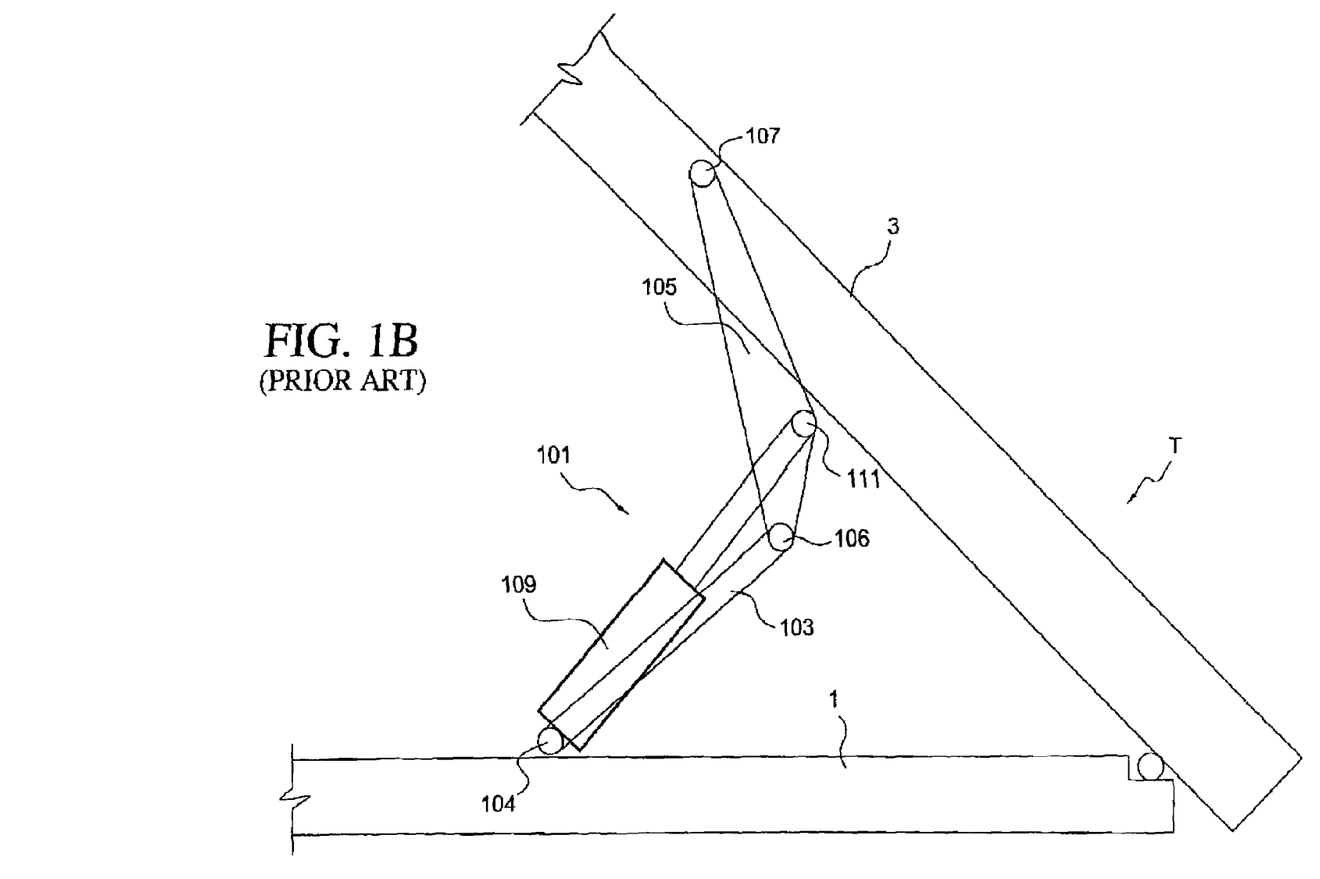
FIG. 1B is a profile, perspective view of the prior art scissor-type hoist (and related installation environment) depicted in FIG. 1A illustrated in an extended (or lifted) state.

Referring now initially to FIGS. 1A and 1B, therein is illustrated a prior art scissor-type hoist 101 known conventionally as a Type 1, Single Stage Scissor as designated by the National Truck Equipment Association ("NTEA"). Although this type of hoist is very common in the truck equipment industry, several inefficiencies and/or drawbacks have been identified as associated with this hoist design. As such, it is this design which serves as a background in view of which the present invention is compared and described.

As shown in the subject figure, hoist 101 is illustrated installed on a truck T and generally comprises a first lever arm 103 pivotally connected at one end to frame rails 1 of truck T via pivot 104 and at its other end to a second lever arm 105 via pivot 106. Lever arm 105, in turn, is pivotally connected to dump bed frame structures 3 via pivot 107. As can be seen, prior art hoist 101 is a scissor-type hoist which employs a lift cylinder 109 (e.g., a single stage hydraulic cylinder) for raising and lowering the dump bed (not shown) of truck T via dump frame 3. Cylinder 109, in this regard, is connected to truck T via pivot 104 at its base end and is connected to lever arm 105, at its other end, via pivot 111. It should be noted that cylinder 109, in its connection to the hoist and the truck to which it is installed, shares a pivot, pivot 104, with the first lever arm (arm 103) of the hoist. As a result, during initial lift phases (such as depicted in FIG. 1A), much of the force of cylinder 109 is inefficiently used because of the low angle of the cylinder relative to the lift direction of the dump bed. Although the angle of the cylinder relative to the lift direction of the dump bed improves in later stages of dump bed lifting operation (see FIG. 1B), the aforedescribed inefficient design of hoist 101 necessitates the use of larger and more powerful lift cylinders than are otherwise required (at least in the initial lift phase). This, of course, adds expense to the hoist as well as increases the weight of the truck and decreases available free space under the dump bed.

Figure 2:
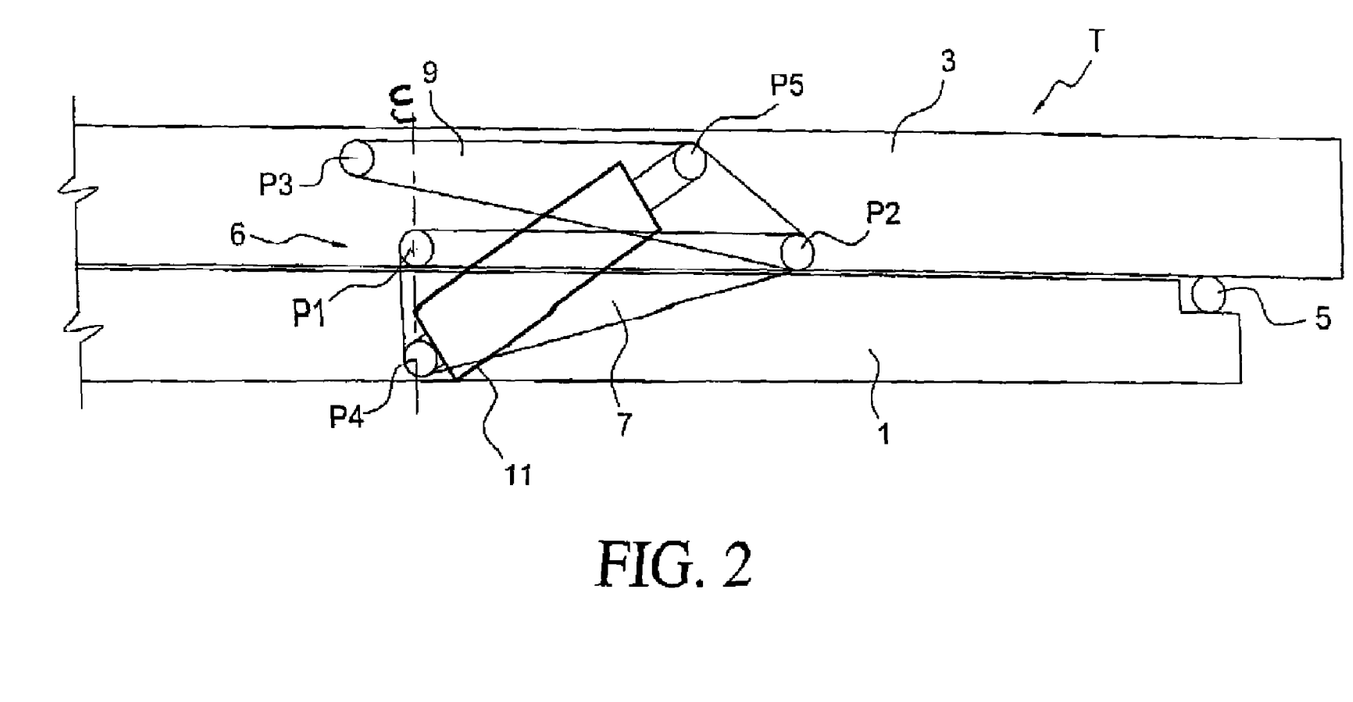
FIG. 2 is a two-dimensional, plan view of one example embodiment of a hoist according to the subject invention shown with the lift cylinder in a non-extended (non-lifted) state (with the example hoist depicted installed between a truck frame and a dump bed).
Figure 3:
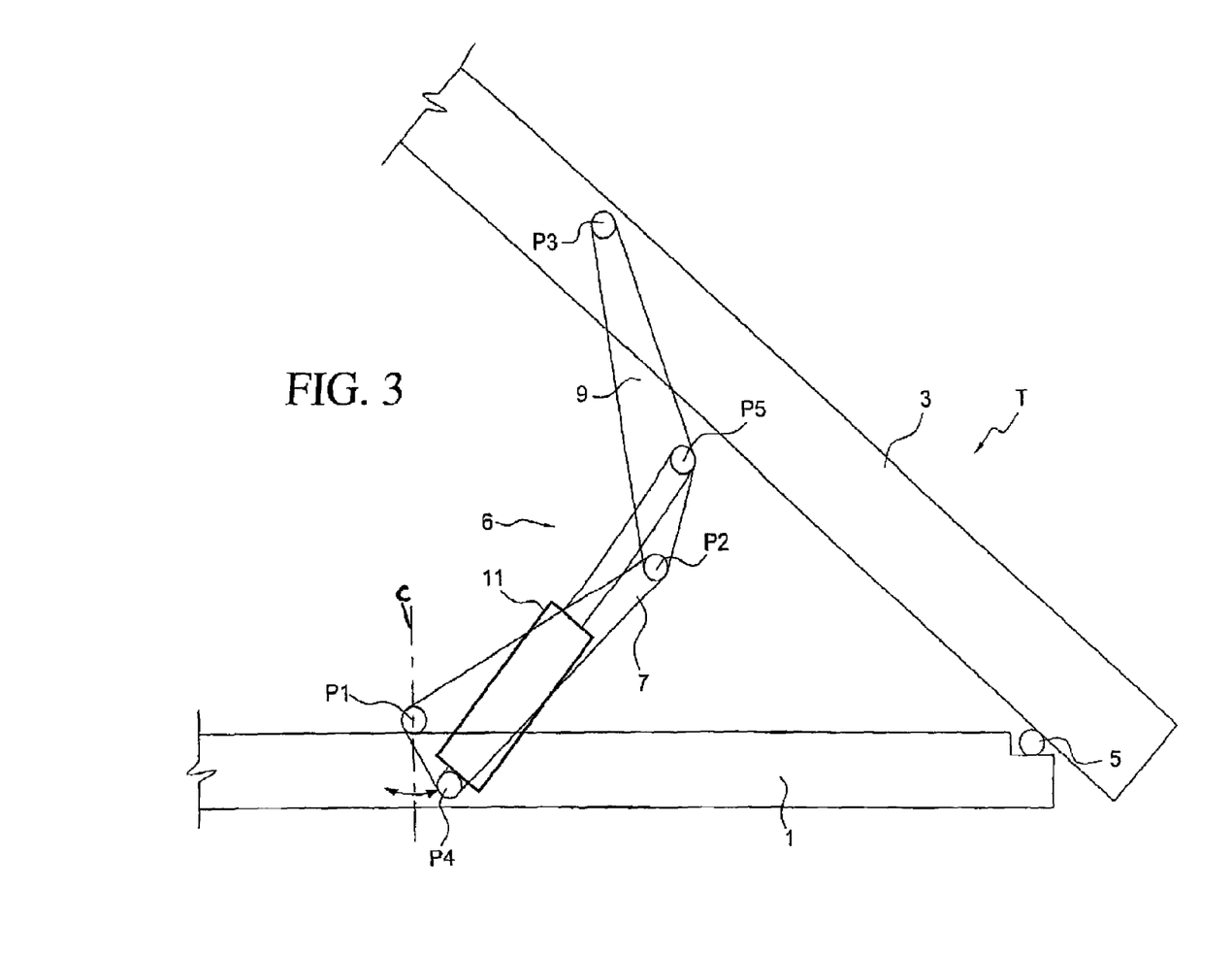
FIG. 3 is an alternative, two-dimensional, plan view of the example hoist depicted in FIG. 2 shown with the lift cylinder in an extended (or lifted) state.
Figure 4:
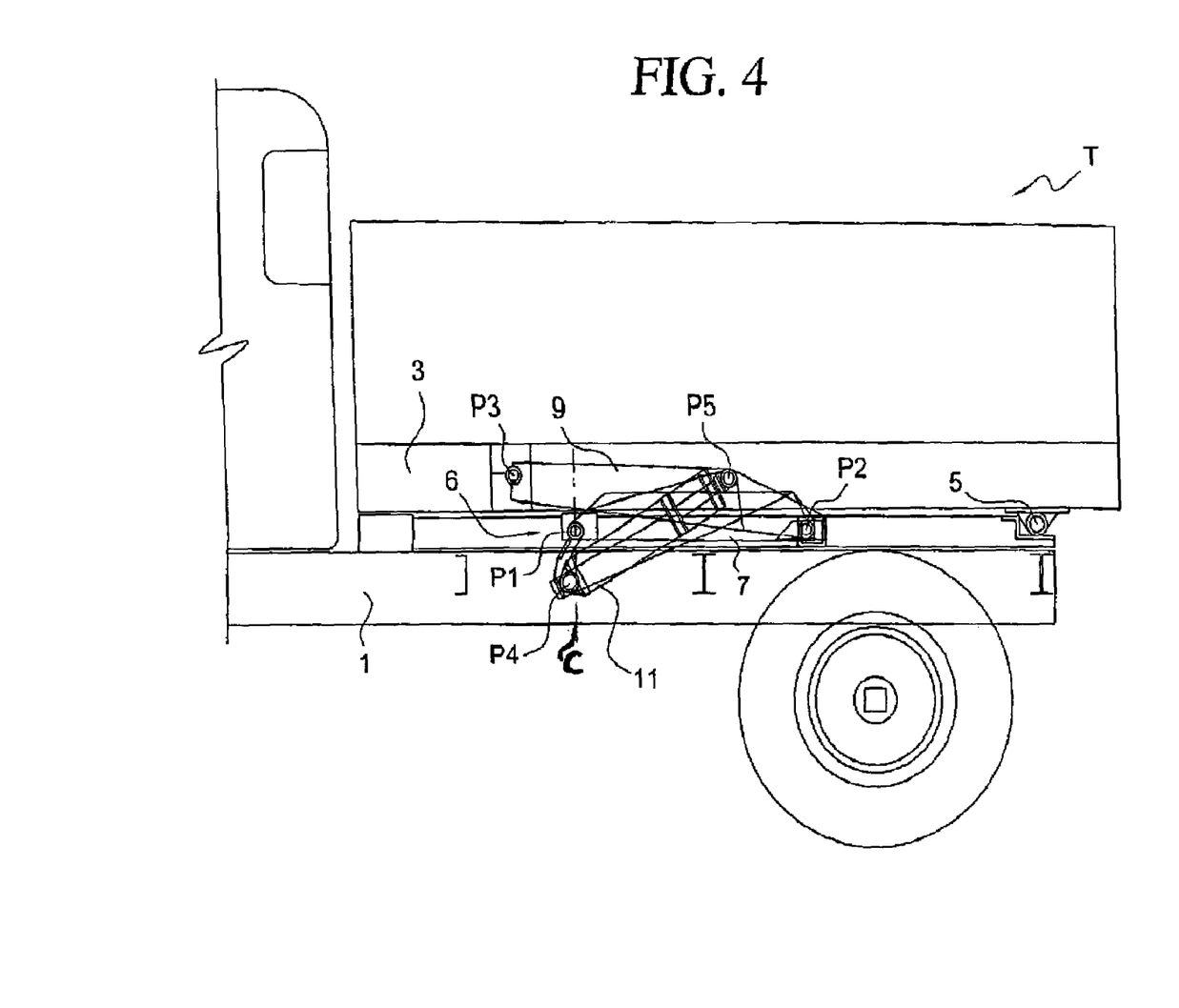
FIG. 4 is a detailed, partial side-view of a truck having a raisable and lowerable dump bed installed with an example hoist according to the subject invention (and the dump bed shown in a non-lifted state).
Figure 5:
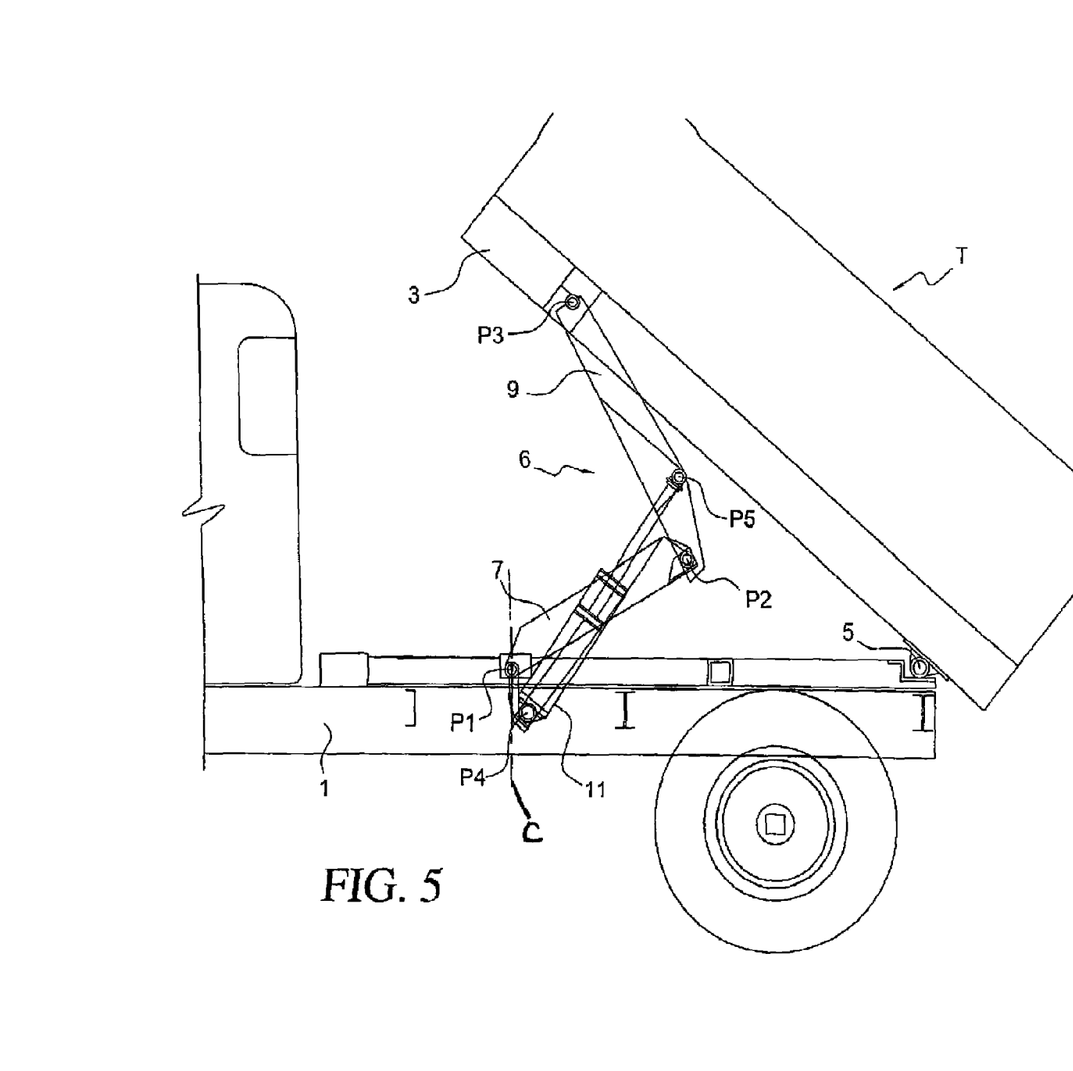
FIG. 5 is a detailed, partial side view of a truck having a raisable and lowerable dump bed installed with an example hoist according to the subject invention (and the dump bed shown in a lifted or raised position for effecting a dumping operation).
Figure 6:
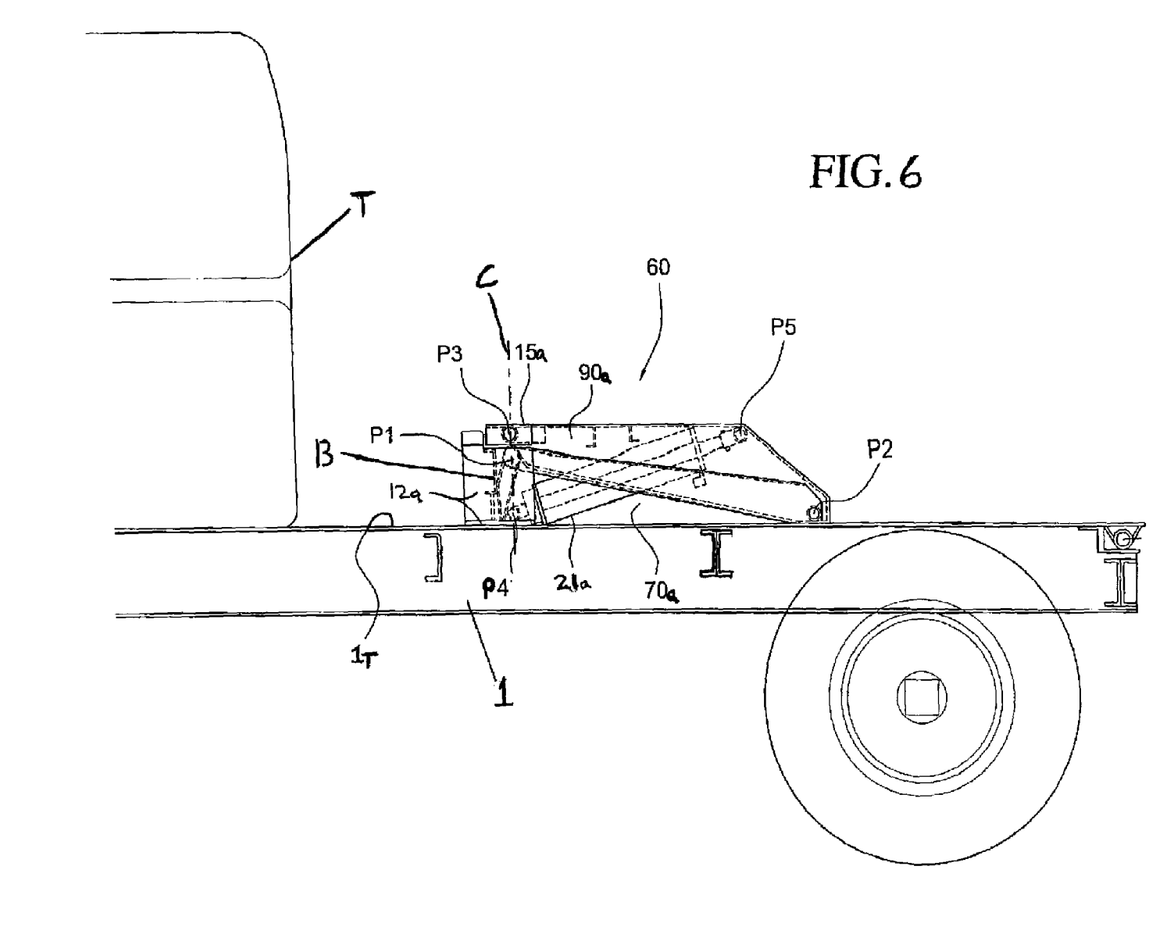
FIG. 6 is a two-dimensional, plan view of an alternative, example embodiment of a hoist according to the subject invention shown with the lift cylinder in a non-extended (non-lifted) state (with the example hoist depicted installed on top of truck frame rails).
Figure 7:
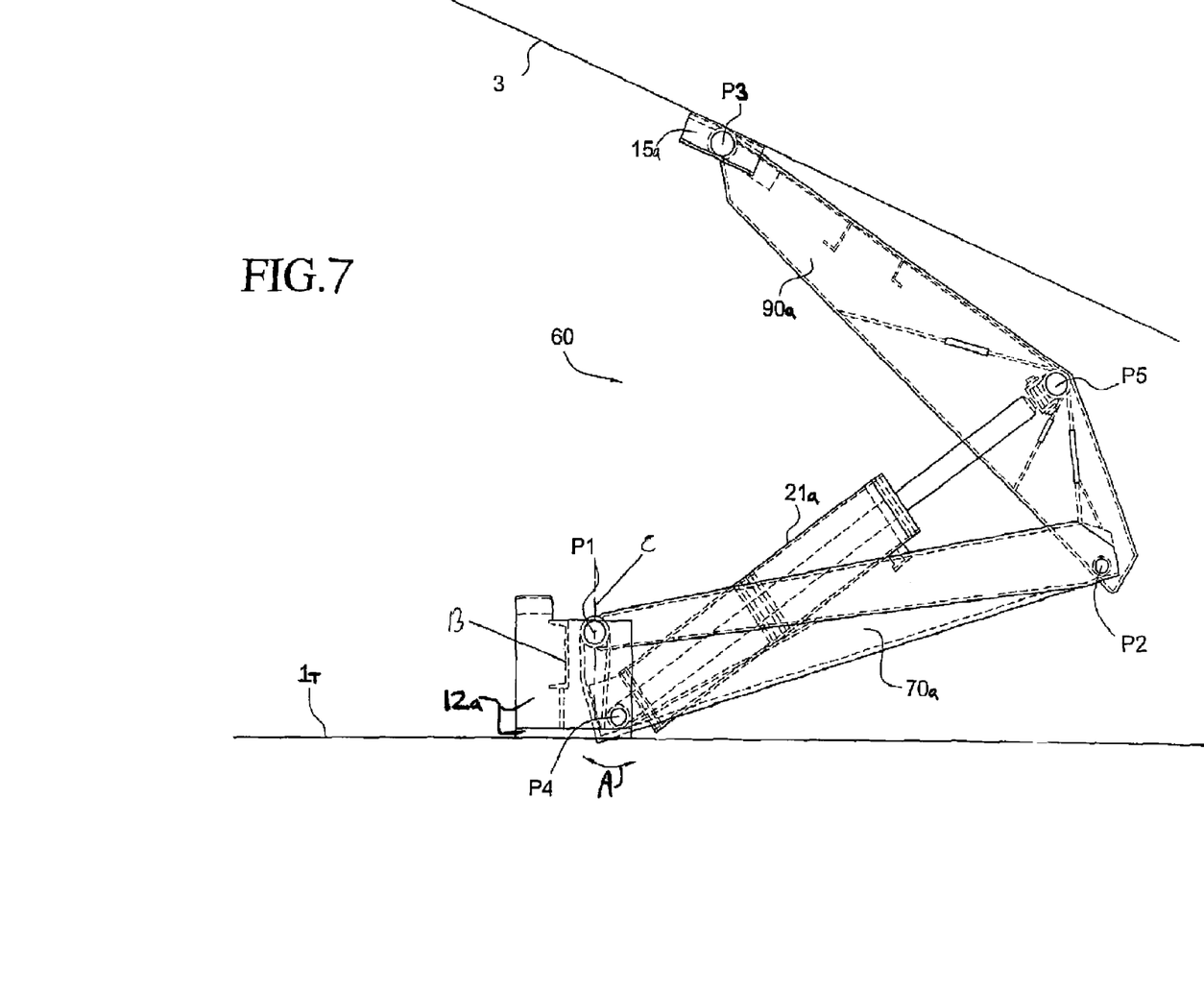
FIG. 7 is an alternative, two-dimensional, plan view of the example embodiment of a hoist illustrated in FIG. 6 shown with the lift cylinder in a partially extended (partially lifted) state (and with the example hoist depicted installed between truck frame rails and a dump bed frame).

Turning now to FIG. 2, this figure illustrates a hoist 6 which reduces the above described inefficiencies in hoist design (i.e., described with respect to the hoist depicted in FIGS. 1A and 1B) in conjunction with a partial view of a conventional dump truck T as one environment in which the present invention (e.g., example embodiment, hoist 6) finds utility. Generally speaking, dump truck T's relevant parts as they relate to this embodiment of the invention include a pair of longitudinal truck frame rails 1 on either side of the vehicle (only one side being shown here), frame 3 of a typical dump bed (the actual bed being omitted for clarity), and a rear pivot 5, all conventional in the art. So as to more clearly illustrate novel hoist 6, various other conventional parts of truck T are not shown.

Referring still to FIG. 2, hoist 6 is shown installed on truck T between truck frame rails 1 and frame 3 of a dump bed. Specifically, first lever arm 7 of the hoist is pivotally connected to the truck at its first end via pivot P1 and is connected at its opposite end to second lever arm 9 via pivot P2. The distal end of second lever arm 9, moreover, is connected to dump bed frame 3 via pivot P3 (e.g., a cross-shaft assembly which substantially spans the width of the dump bed frame). Providing lifting power to hoist 6, an extendible and retractable hydraulic cylinder 11 is pivotally connected to first lever arm 7 via pivot P4 and to second lever arm 9 via pivot P5 (located generally between pivots P2 and P3).

Notably, unlike the prior art hoist illustrated in FIGS. 1A and 1B, cylinder 11 of hoist 6 does not share a pivot with its lower scissor arm (lever arm 7) as its connection to truck T. Instead, lever arm 7 of the inventive hoist is a generally triangularly shaped structure (although it need not be) with pivots P1, P2, and P4 located generally at (and thereby "forming") the three corners of the triangle. Thus, in the illustrated embodiment, rather than connecting cylinder 11 directly to truck frame rails 1 via pivot P1, cylinder 11 is connected to pivot P4 located on triangularly configured lever arm 7 (although, in some embodiments, it could be connected to the truck frame rails at a location spaced a select vertical distance below pivot P1 while still retaining some, but not all, of the improvements of other embodiments described herein). Furthermore, when hoist 6 is in the non-lift phase or position or in the beginning of the lift phase (e.g., when the arms of the hoist are folded down upon one another and therefore generally, but not precisely, parallel to one another) such as illustrated in FIG. 2, pivot P4 is located generally below and approximately in-line with the vertical centerline "C" of pivot P1 (certainly, however, pivot P4 can be located somewhat offset from centerline "C" as long as it is located sufficiently below pivot P1 to achieve the benefits described herein). Importantly, locating pivot P4 as such (as the point at which cylinder 11 is attached to the lever arm), the angle of thrust of cylinder 11 with respect to the lift direction of the dump bed is improved (i.e., the thrust angle is more nearly parallel to the lift direction). More specifically, rather than the lift cylinder being oriented largely perpendicular to the dump bed lift direction in the non-lift phase (i.e., at or near the beginning of the lift phase) such as prior art hoist 101 depicted in a non-lifted state in FIG. 1A, locating pivot P4 below and generally vertically in-line with pivot P1 angles cylinder 11 away from a perpendicular orientation with respect to the lift direction and more parallel thereto (i.e., more in-line therewith). Angling or re-orienting cylinder 11 as such, lift efficiency is improved and smaller, less powerful (and therefore typically cheaper and/or lighter) lift cylinders can be employed and/or the weight lifting capacity of the hoist is increased.

It should be understood, of course, that even though it is the relative location of pivot P4 beneath and generally vertically in-line with pivot P1 in the beginning of the lift phase that enables the improved efficiencies of the subject hoist invention, it is not intended that the scope of the invention be limited to specific spacing(s) between pivots P1 and P4 or limited to particular degrees of vertical alignment thereof. Instead, it is simply important that, whatever quantity of vertical spacing is chosen and/or whatever degree of vertical alignment is selected, the angle of orientation of cylinder 11 with respect to the lift direction of the dump bed which is obtained provides improved lift efficiency (i.e., as compared to prior art hoists where the lift cylinder and the lower scissor arm share a pivot). It should be further understood that the configurations of one or both of lever arms 7 and 9 can be changed without departing from the scope of the invention as long as the relative (but not necessarily specific) locations of pivots P1-P5 are maintained with respect to one another. This contemplates and includes, for example, an embodiment in which pivot P4 is not located on lever arm 7 at all but, instead, is located on the truck or truck frame; lever arm 7, as a result, therefore, not necessarily being triangular in configuration (pivot P4, nevertheless, still being located generally below and generally in-line with pivot P1). This embodiment, however, would not favorably affect the length of cylinder stroke used in lifting operations such as described herein below.

Despite not being specifically limited to particular pivot spacing(s) or lever configurations, certain non-limiting embodiments of hoist 6, such as illustrated in FIGS. 2-5, are believed to be capable of improving the lift capacity of the hoist by 20% or more. Furthermore, in embodiments such as illustrated, because pivot P4 moves during operation of the hoist, generally following the direction of the dump bed as it is lifted (see FIG. 3 where the movement of pivot P4 is indicated by directional arrows), the length of stroke of cylinder 11 which is needed to achieve full dump bed lift height is decreased (notwithstanding other embodiments of the invention in which pivot P4 is located on the truck frame and therefore does not "travel", for example). In the embodiment illustrated, for example, the required stroke length to achieve full lift is believed to be reduced by more than 20% without reducing the lift capacity of the hoist.

Hoist 6, of course, can include more than one cylinder and/or sets of lever mechanisms (e.g., pairs of pivotally connected lever arms 7 and 9). In this regard, the hoist lever assemblies and/or respective lift cylinders may be duplicated on each side of a truck frame, for example (other embodiments, where more than two lever assemblies or lift cylinders are employed are contemplated as well). Moreover, either single stage or multi-stage telescopic cylinders can be used (nevertheless, although useful with the subject invention, expensive, multi-stage, telescopic cylinders are generally obviated by the hoists described and claimed herein).

Figure 8:
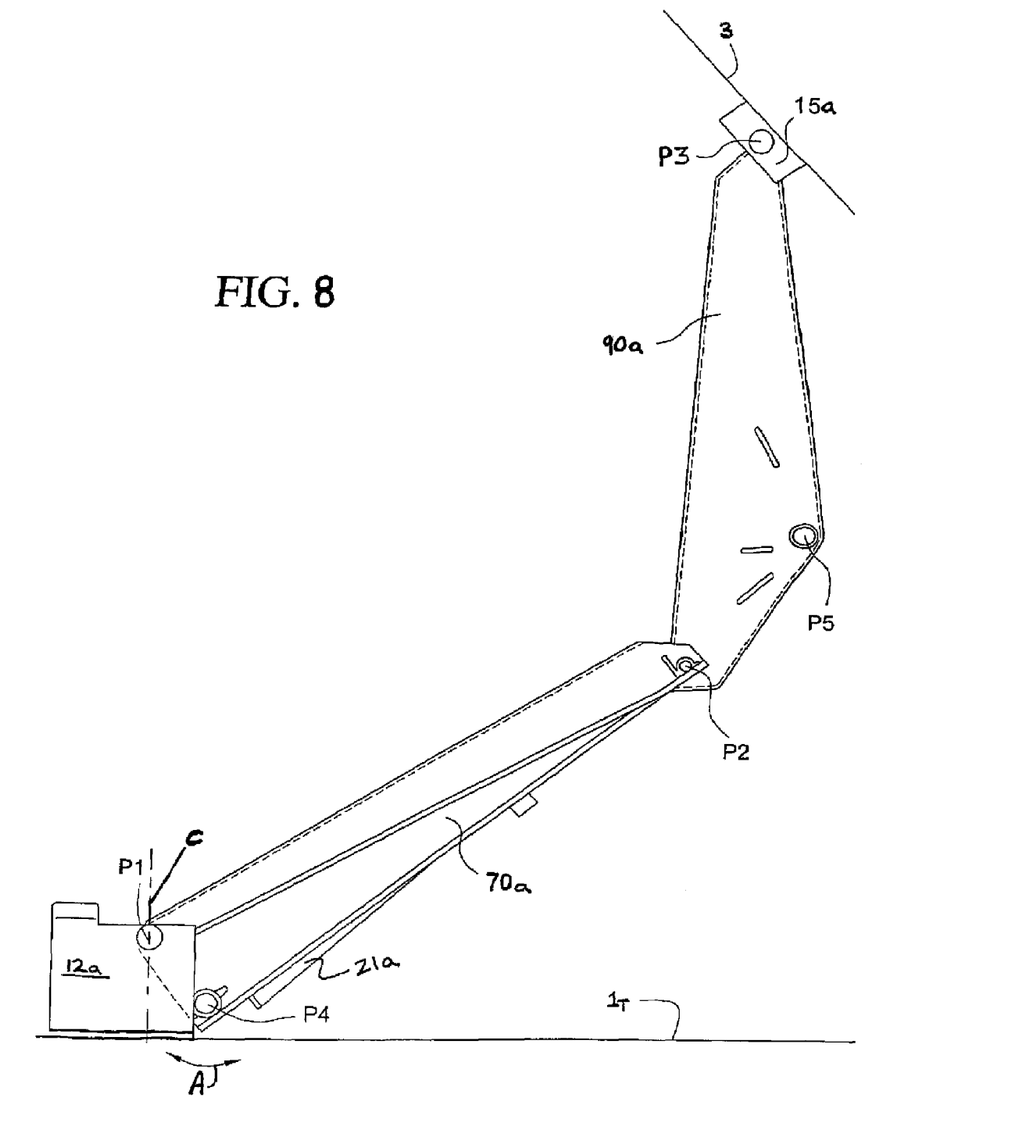
FIG. 8 is an alternative, two-dimensional, plan view of the example embodiment of a hoist illustrated in FIG. 7 shown with the lift cylinder in a fully extended (fully lifted) state (and with the example hoist depicted installed between truck frame rails and a dump bed frame).
Figure 9:
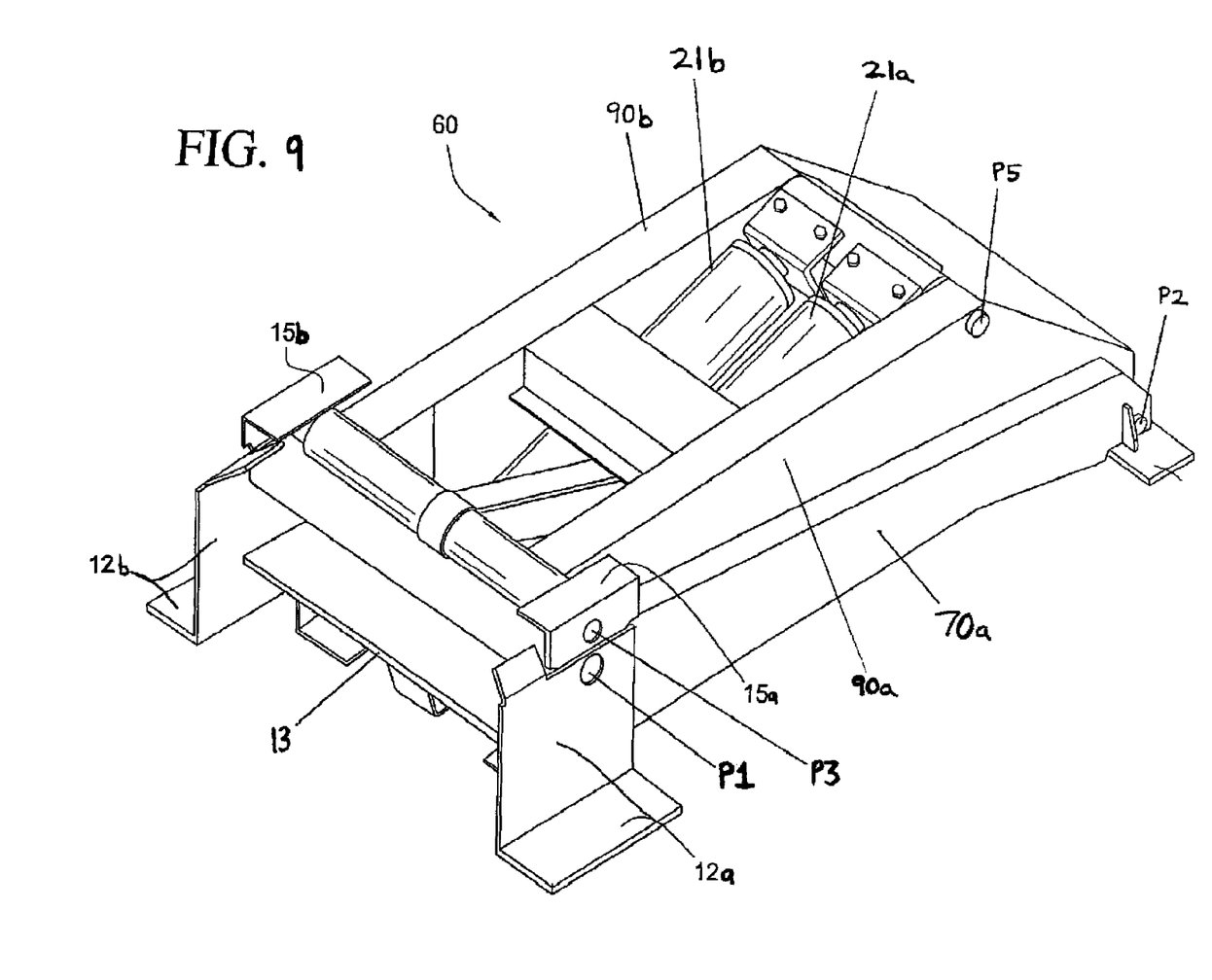
FIG. 9 illustrates a three-dimensional, perspective view of one exemplar embodiment of a hoist according to the subject invention.

Referring now to FIGS. 6-9, an alternative hoist embodiment, shown as hoist 60, is illustrated therein. As can be in these figures, hoist 60 employs a pair of pedestals 12a and 12b (in some embodiments, connected via a cross member 13 such as shown in FIG. 9), each located on a top surface $1_T$ of respective frame rails 1, as the mount location for the base of the hoist (rather than locating pivots P1 and P4 generally or entirely between frame rails 1 of truck "T" when the hoist is in the non-raised or pre-lift state such as with hoist 6). Moreover, the particular example embodiment which is illustrated employs a duplicate lever arm set on each side of the vehicle (70a, 90a and 70b, 90b, respectively), each example lever arm set being configured to be operated synchronously with the other (only one side or set being visible in FIGS. 6-8; FIG. 9 being the only three-dimensional figure). In this regard, each lever arm set 70a, 90a and 70b, 90b is connected to pivots P1, P2, P3 and P4 in a mirror image configuration with respect to the other (that is, with one lever arm set on one side of the hoist being substantially or entirely duplicated on the other side).

More specifically, and referring still to FIGS. 6-9, first lever arms 70a and 70b are each pivotally connected to brackets 12a and 12b at their first ends via pivot P1, respectively, and are connected at their opposite ends to second lever arms 90a and 90b via pivot P2, respectively (pivots P1 and P2 including or comprising cross-shafts in this embodiment). The distal ends of second lever arms 90a and 90b, moreover, are each connected to respective brackets 15a and 15b via pivot P3 (also including or comprising a cross-shaft in this example embodiment) which, in turn, are connected to dump body frame 3. To power the hoist, a pair of extendible and retractable hydraulic cylinders 21a and 21b are pivotally connected to first lever arms 70a and 70b via pivot P4 at one end and to second lever arms 90a and 90b via pivot P5 at the other (and, in turn, are connected to a conventional hydraulic system, not shown, for extending or retracting the cylinders to lift or lower the hoist respectively).

At the beginning of hoist 60 operation, when hoist 60 is in a non-lifted state and cylinders 21a and 21b are fully retracted (see FIG. 6), similar to the configuration of hoist 6 at the beginning of its lift phase, pivot P4 is located generally below and generally in line with the vertical centerline "C" of pivot P1 (but it can be located offset from such centerline as well). As with hoist 6, locating pivot P4 as such establishes an improved cylinder lift angle with respect to the lift direction of dump bed frame 3 (with lift force being applied against pivot 5) thereby improving lift efficiency as compared to prior art hoists. Further similar to hoist 6, as cylinders 21a and 21b are pressurized and hoist 60 is extended or "lifted", pivot P4 follows the lift direction of the hoist (as indicated by arrows A in FIGS. 7 and 8), thereby reducing the cylinder stroke length needed to achieve a full dump bed lift angle.

Turning now to the structural differences and potential commercial advantages of hoist 60 (e.g., as compared to hoist 6), the use of pedestals 12a and 12b by the hoist elevates certain hoist parts so that space usage by hoist 60 between vehicle frame rails 1 is substantially reduced (but preferably minimized or even eliminated, in certain embodiments). In this regard, although the general (but not necessarily specific) orientation and spatial relationship of hoist parts with respect to one another remains generally the same in hoist 60 as compared to hoist 6 (thereby retaining lift angle advantages and the like such as described throughout the specification herein), pedestals 12a and 12b are employed in hoist 60 principally to raise the mounting position of pivots P1 and P4 (and their associated assemblies or parts) above the horizontal plane of the top surface $1_T$ of frame rails 1. In particular, raising pivots P1 and P4, as such, raises the first (lowermost) ends of cylinders 21a and 21b, as well as the first ends of lever arms 70a and 70b (proximal to and including pivot P4 including the associated cross-shaft), above the horizontal plane of the top surface $1_T$ of frame rails 1. Raising the mount location of the parts of the hoist in this manner (as described herein and as depicted in FIGS. 6-9) entirely removes hoist 60 from the horizontally extending space envelope extending between frame rails 1 thereby freeing up such space between the frame rails for the installation or operation of other components of or for the vehicles on which hoist 60 may be installed. For example, use of hoist 60 (such as compared to other hoist types, including hoist 6) leaves or maintains an unencumbered space envelope between frame rails 1 so that safety related components may be installed therein such as might be required by current or future highway safety laws (e.g., such as those administered or enforced by the National Highway Traffic Safety Administration).

As an additional advantage to hoist 60 (e.g., as compared to hoist 6), raising the mount location of pivot P1 (e.g., relative to hoist 6) decreases the distance between pivot P1 and pivot P3 when hoist 60 is in a fully lifted or extended position (such as illustrated in FIG. 8). As a result, the total required lift distance of the hoist, that is the distance which the hoist must raise frame 3 to obtain a full lift angle, is decreased appreciably while still retaining much of the lift efficiency improvements of the hoist (i.e., as compared to prior art hoists) which primarily result from improved initial lift angles (e.g., obtained by locating pivot P4 generally below pivot P1 at the beginning of the lift phase). In certain embodiments, in this regard, it is contemplated that such total required lift distance can be reduced by as much as 8-10 inches, thereby again reducing the size of lift cylinders needed for hoist lift operations.

Although, in the illustrated embodiment, certain hoist parts (as discussed herein) are depicted located entirely above the plane of top surface $1_T$, other embodiments in which such parts are only partially raised relative to surface $1_T$ (e.g., such as compared to the orientation and/or location of parts of hoist 6) are, of course, contemplated as within the scope of the invention. Furthermore, just as with hoist 6, hoist 60, can, of course (such as in other embodiments not specifically illustrated in the present application), include as few as one or, alternatively, more than two hydraulic cylinders and/or sets of lever arms or mechanisms. Also similar to hoist 6, either single stage or multi-stage telescopic cylinders can be used with such hoists (recognizing that the hoist designs disclosed herein largely obviate the need for multi-stage, telescopic cylinders). Moreover, it is contemplated that hoists of this invention may be used in other applications other than for rear dumping vehicles.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, unless unequivocally set forth as expressly uniquely defined or as otherwise limiting, is not intended to impart a narrowing scope to the invention in contravention of the ordinary meaning of the claim terms by which the scope of the patent property rights shall otherwise be determined:

I claim:

1. A hoist for raising or lowering a truck bed to and from a truck frame, said hoist comprising:
    a pedestal located on and extending upwardly from a top surface of a frame rail of a truck frame for mounting said hoist to a truck frame;
    a first lever arm having a first end connected to said pedestal via a first pivot and having a second end connected to a first end of a second lever arm via a second pivot, said second lever arm having a second, distal end pivotally connected to a dump bed frame via a third pivot;
    an extendible and retractable cylinder connected at a first end to said first end of said first lever arm via a fourth pivot, said fourth pivot being located at a location spaced apart from said first pivot, and said extendible and retractable cylinder connected at a second end to said second lever arm via a fifth pivot, said fifth pivot located on said second lever arm between said second pivot and said third pivot;
    wherein in an initial, non-lift position, said first lever arm and said second lever arm are in a generally folded orientation such that said first and said second lever arms are in or near a generally parallel orientation with respect to one another, and said fourth pivot is located generally below said first pivot a selected offset distance sufficient to improve said extendible and retractable cylinder's lift angle relative to a lift direction of said dump bed frame;
    wherein in a lifting phase, said extendible and retractable cylinder extends and exerts a lifting force on said second lever arm via said fifth pivot causing said second lever arm to exert a lifting force on said dump bed frame via said third pivot; and wherein said first lever arm and said second lever arm pivot out of the in or near generally parallel orientations towards a dump bed lifted position; and
    wherein the location of said pedestal on said top surface of said frame rail locates said hoist at a elevated position relative to said frame rail thereby reducing space usage between frame rails when said hoist is installed on a vehicle.

2. The hoist according to claim 1 wherein, in said initial, non-lift position, said fourth pivot is initially located generally or directly in-line with a vertical centerline of said first pivot.

3. The hoist according to claim 1 wherein, in said initial, non-lift position, said fourth pivot is located offset from a vertical centerline of said first pivot.

4. The hoist according to claim 1 wherein said hoist is so structurally configured such that when said hoist is operated in said lifting phase, and said second lever arm is caused to unfold from and lift upwardly from said first lever arm during said lifting phase, said fourth pivot moves about said first pivot and generally follows a lift direction of said second lever arm.

5. The hoist according to claim 1 wherein said first end of said extendible and retractable cylinder and said fourth pivot are connected to said pedestal generally vertically below said first pivot.

6. The hoist according to claim 1 wherein said pedestal, said first and second lever arms, and said first, second, third, fourth, and fifth pivots are each substantially duplicated spaced apart from one another, and wherein each of said respective substantially duplicate pairs of first, second, and third pivots are connected to and joined by respective first, second, and third cross-shafts.

7. The hoist according to claim 6 wherein each of said substantially duplicated, spaced apart pedestals are joined to one another by a cross member.

* * * * *